US012647026B2

(12) United States Patent
Illiano

(10) Patent No.: US 12,647,026 B2
(45) Date of Patent: Jun. 2, 2026

(54) DC/DC CONVERTER WITH A CHARGE PUMP SUB-CIRCUIT FOR BOOST OR BUCK MODE

(71) Applicant: ABB Schweiz AG, Baden (CH)

(72) Inventor: Enzo Illiano, Giubiasco (CH)

(73) Assignee: ABB Schweiz AG, Baden (CH)

( * ) Notice: Subject to any disclaimer, the term of this patent is extended or adjusted under 35 U.S.C. 154(b) by 300 days.

(21) Appl. No.: 18/212,331

(22) Filed: Jun. 21, 2023

(65) Prior Publication Data

US 2023/0421058 A1 Dec. 28, 2023

(30) Foreign Application Priority Data

Jun. 22, 2022 (EP) ..................................... 22180345

(51) Int. Cl.
| | |
|---|---|
| *H02M 3/07* | (2006.01) |
| *H02M 1/00* | (2007.01) |
| *H02M 7/483* | (2007.01) |
| *H02M 3/02* | (2006.01) |
| *H02M 3/16* | (2006.01) |

(52) U.S. Cl.
CPC ........... *H02M 3/07* (2013.01); *H02M 1/0095* (2021.05); *H02M 7/4837* (2021.05)

(58) Field of Classification Search
CPC .. H02M 1/0058; H02M 3/01; H02M 3/33571; H02M 1/007; H02M 3/156; H02M 1/0064; H02M 3/015; H02M 3/155; H02M 3/157–1588; H02M 3/335; H02M 3/33569–33592; H02M 3/158; H02M 1/0095; H02M 7/4837
See application file for complete search history.

(56) References Cited

U.S. PATENT DOCUMENTS

| | | | |
|---|---|---|---|
| 8,350,540 B2 | 1/2013 | Cuk | |
| 10,637,352 B2 | 4/2020 | Illiano | |
| 2007/0230228 A1 | 10/2007 | Mao | |
| 2017/0104416 A1* | 4/2017 | Kataoka | ................. H02M 3/158 |

(Continued)

OTHER PUBLICATIONS

M. Uno and A. Kukita, "PWM Switched Capacitor Converter With Switched-Capacitor-Inductor Cell for Adjustable High Step-Down Voltage Conversion," in IEEE Transactions on Power Electronics, vol. 34, No. 1, pp. 425-437 (Year: 2019).*

(Continued)

*Primary Examiner* — Monica Lewis
*Assistant Examiner* — Ularislao Cordova
(74) *Attorney, Agent, or Firm* — Fitch Even Tabin & Flannery LLP

(57) ABSTRACT

A method for operating a DC/DC converter that includes a sub-circuit with an inductance in series with and directly connected to an arrangement of a diode in parallel to a capacitance, the diode blocking during loading the capacitance, the method including loading the capacitance by connecting a first end of the sub-circuit to a plus terminal of a DC voltage source and a second end of the sub-circuit to a minus terminal of the DC voltage source; connecting the first end of the sub-circuit to a plus terminal of an output of the DC/DC converter and the second end of the sub circuit to the plus terminal of a DC voltage source; and disconnecting the first end and the second end of the sub-circuit.

13 Claims, 8 Drawing Sheets

(56) References Cited

U.S. PATENT DOCUMENTS

2022/0094268 A1    3/2022  Wang

OTHER PUBLICATIONS

Figure 4A:
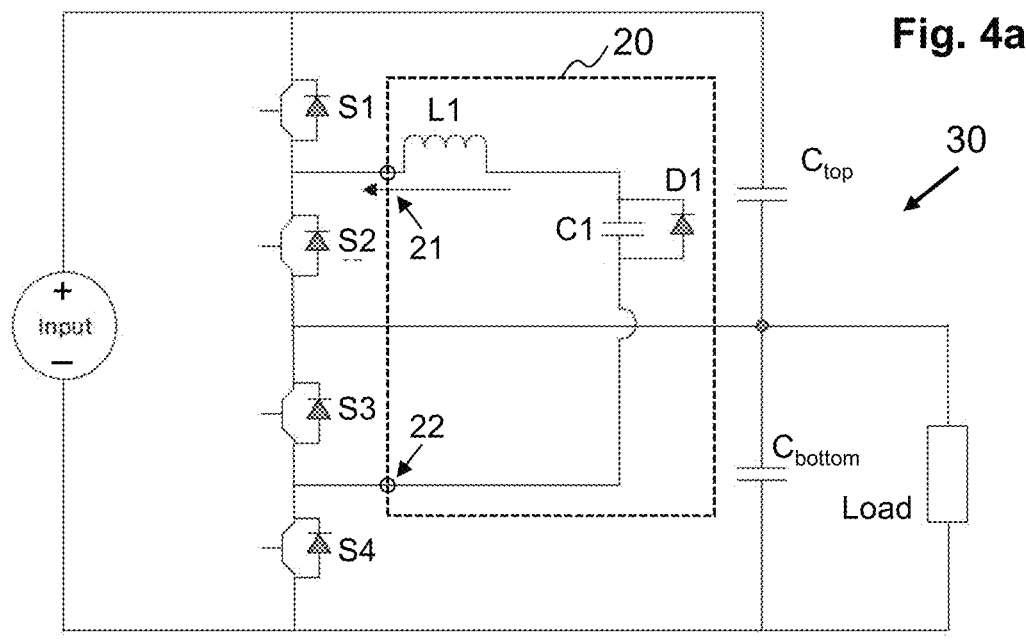

Serrano et al., "Impact of the Flying Capacitor on the Boost Converter," Annual Seminar on Automation, Industrial Electronics and Instrumentation(SAAEI'16),5 pp.(Jul. 6-8, 2016) (Year: 2016).*

Waradzyn et al., "GaN-Based DC-DC Resonant Boost Converter with Very High Efficiency and Voltage Gain Control," Energies, 13(23): 21 pp. (Dec. 3, 2020) (Year: 2020).*

Pillonnet, "Modeling and Efficiency Analysis of Multiphase Resonant-Switched Capacitive Converters," *IEEE Transactions on Power Electronics,* 31(1): 11-14 (Sep. 21, 2015).

Schaef et al., "A 3-Phase Resonant Switched Capacitor Converter Delivering 7.7 W at 85% Efficiency Using 1.1 nH PCB Trace Inductors," *IEEE J. of Solid-State Circuits,* 50(12): 2861-2869 (Nov. 24, 2015).

Serrano et al., "Impact of the Flying Capacitor on the Boost Converter," *Annual Seminar on Automation, Industrial Electronics and Instrumentation* (SAAEI'16), 5 pp. (Jul. 6-8, 2016).

Uno et al., "PWM Switched Capacitor Converter With Switched-Capacitor-Inductor Cell for Adjustable High Step-Down Voltage Conversion," *IEEE Transactions on Power Electronics,* 34(1): 425-437 (Nov. 19, 2018).

Waradzyn et al., "GaN-Based DC-DC Resonant Boost Converter with Very High Efficiency and Voltage Gain Control," *Energies,* 13(23): 21 pp. (Dec. 3, 2020).

European Patent Office, Extended European Search Report in European Patent Application No. 22180345.5, 14 pp. (Nov. 22, 2022).

* cited by examiner

Fig. 1a
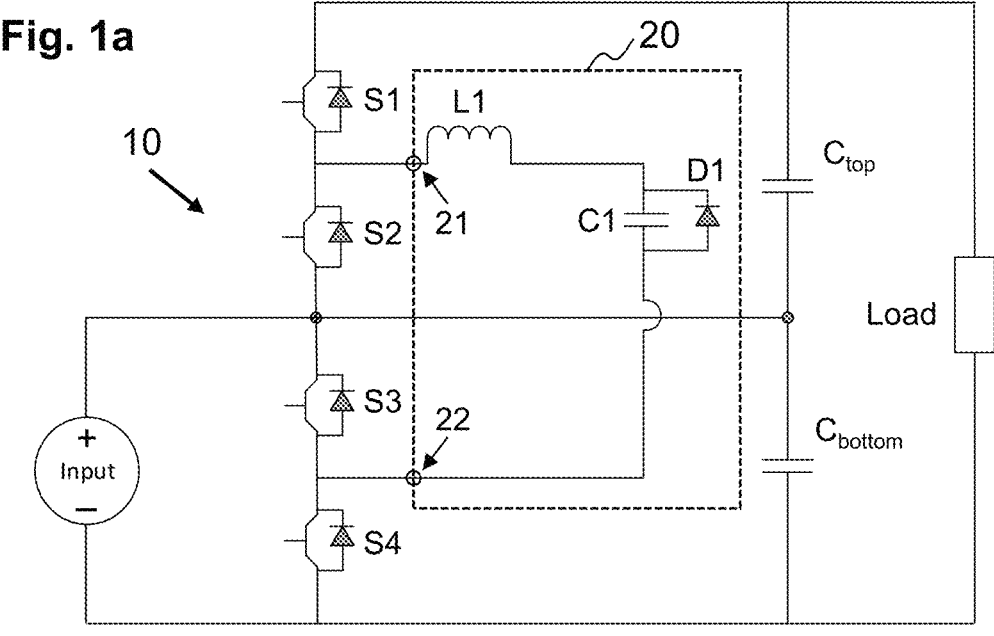
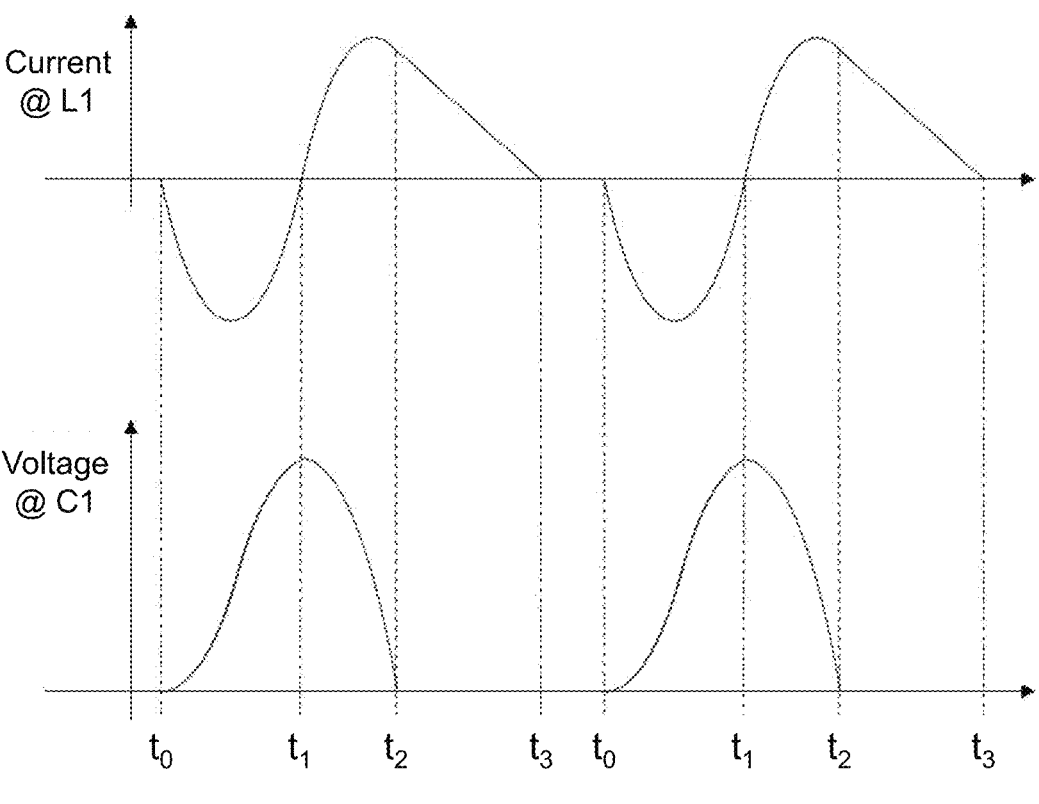
Fig. 1b

Fig. 2a
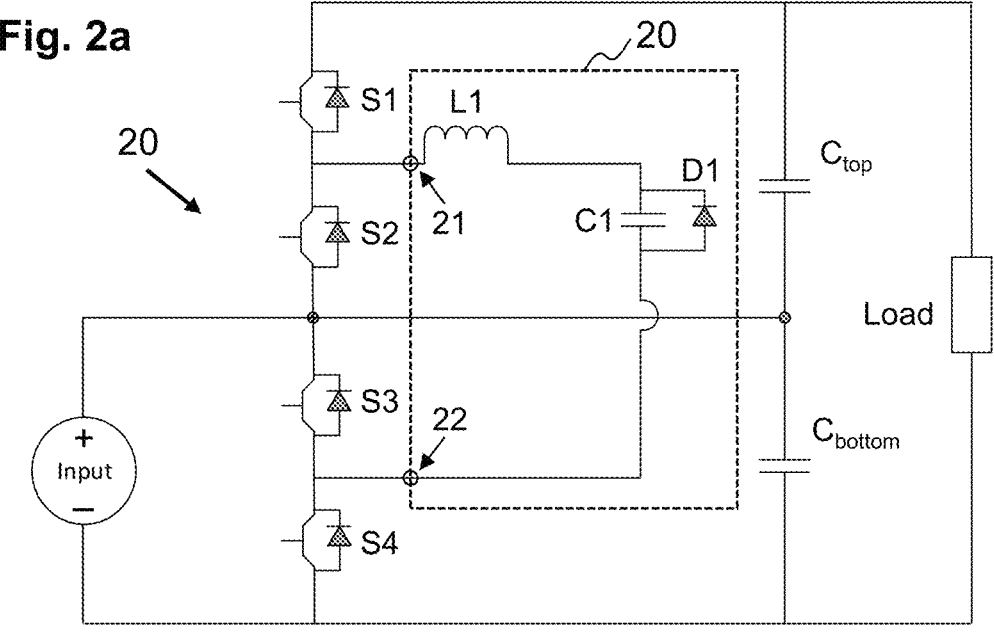
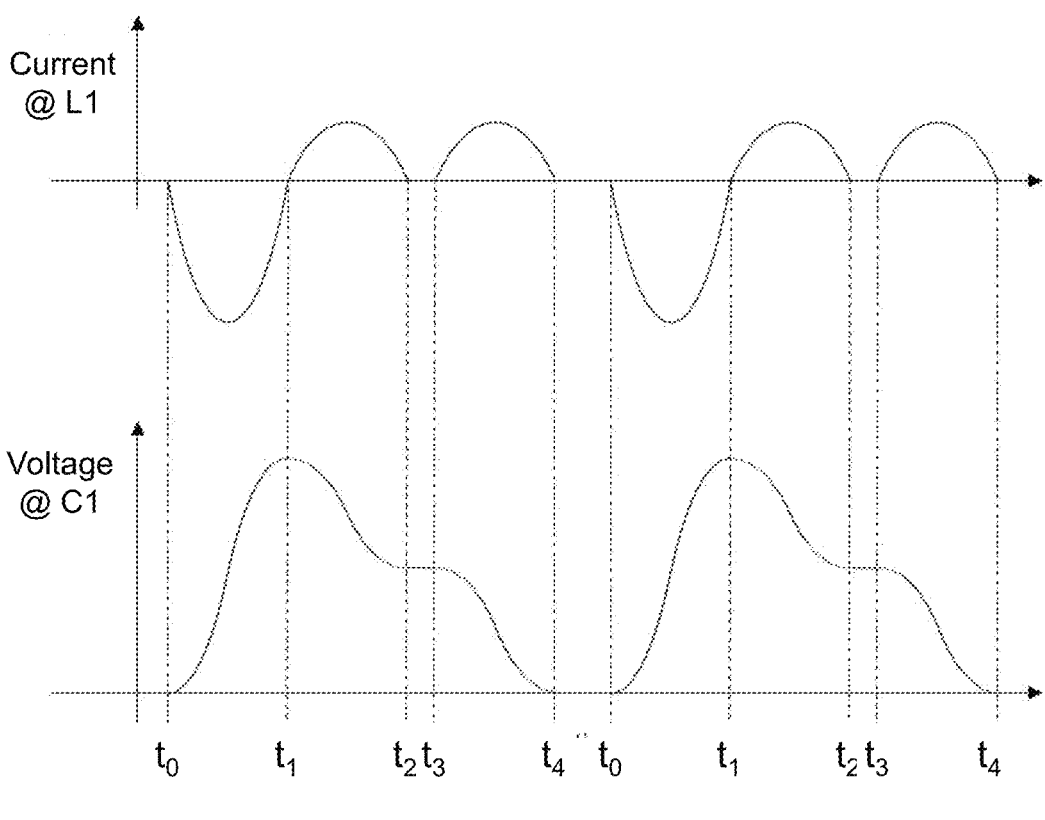
Fig. 2b

Fig. 3a
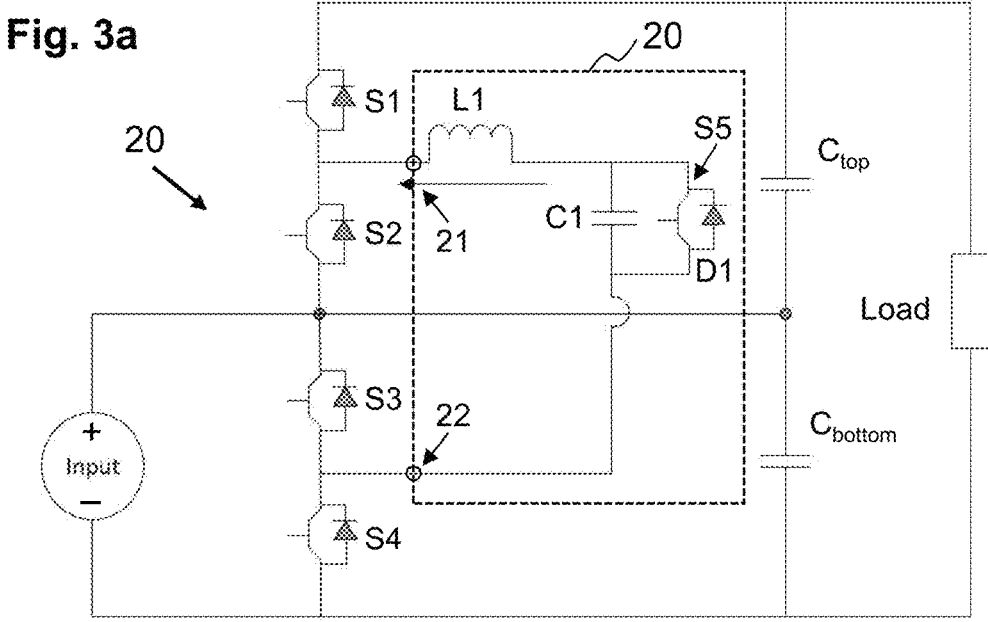
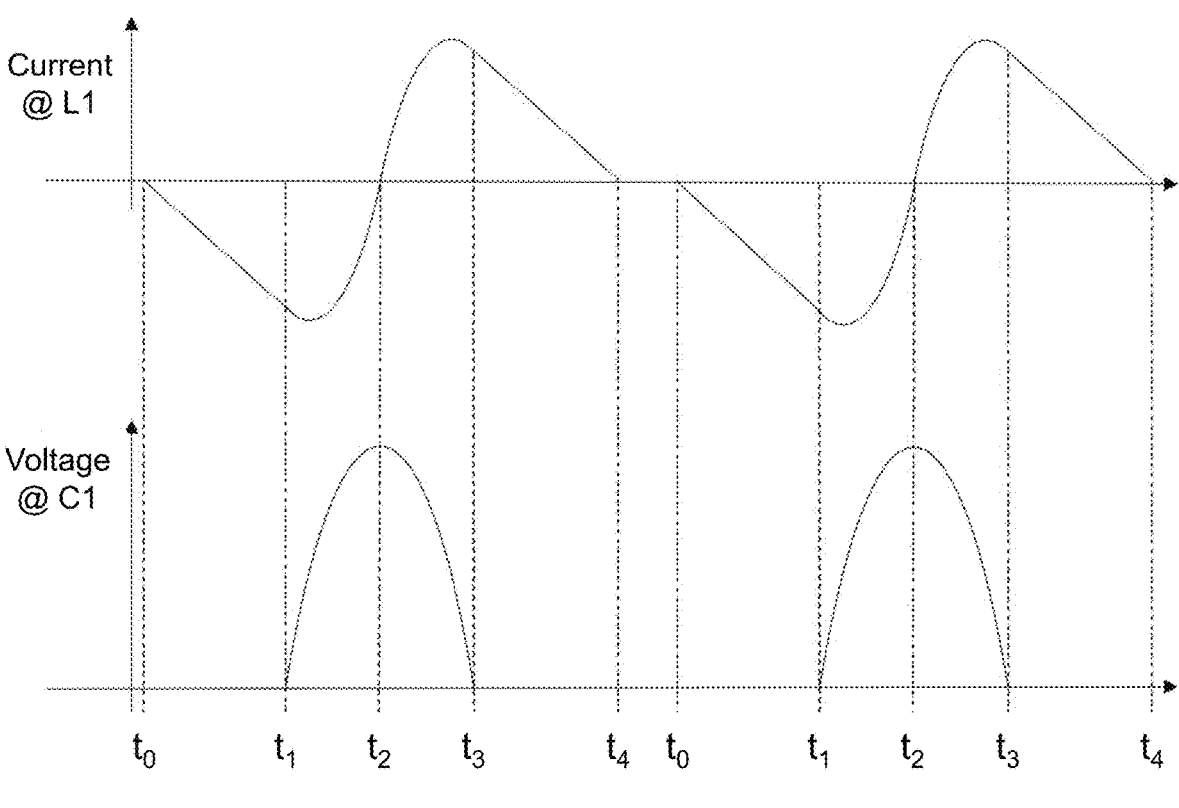
Fig. 3b

100

300

400

500

DC/DC CONVERTER WITH A CHARGE PUMP SUB-CIRCUIT FOR BOOST OR BUCK MODE

CROSS-REFERENCE TO RELATED APPLICATIONS

The instant application claims priority to European Patent Application No. 22180345.5, filed Jun. 22, 2022, which is incorporated herein in its entirety by reference.

FIELD OF THE DISCLOSURE

The present disclosure generally relates to the field of DC/DC converters and, more particularly, to converters operating under the charge pump principle.

BACKGROUND OF THE INVENTION

Charge pumps are basically capable of having benefits in terms of power density, e.g., compared to at least some other types of DC-DC converters. Hence, it would be desirable to provide an enhanced DC/DC converter, based on charge pump principle, which can deliver high power, and which can be run either in buck mode or in booster mode.

BRIEF SUMMARY OF THE INVENTION

The present disclosure describes an enhanced DC/DC converter, which operates based on the charge pump principle. One aspect relates to a method for operating a DC/DC converter in a booster mode, the DC/DC converter comprising a sub-circuit with an inductance in series with and directly connected to an arrangement of a diode in parallel to a capacitance. The method comprises the steps of: loading the capacitance, by connecting a first end of the sub-circuit to a plus terminal of a DC voltage source and a second end of the sub-circuit to a minus terminal of the DC voltage source; connecting the first end of the sub-circuit to a plus terminal of an output of the DC/DC converter and the second end of the sub-circuit to the plus terminal of a DC voltage source; and disconnecting the first end and the second end of the sub-circuit.

The operating principle of several embodiments of this DC/DC converter is based on the same idea; however, the embodiments are optimized for specialized applications, particularly for defined conversion ratios. For a broader applicability, the embodiments may be mixed, e.g., cascaded.

All embodiments of the DC/DC converter include a distinct sub-circuit, which comprises an inductance and a capacitance in series. Additionally, the sub-circuit comprises a diode in parallel to the capacitance, the diode blocking during loading the capacitance. "Blocking during loading the capacitance" means that in the loading phase—i.e. when the switches of the DC/DC converter realize a (direct or indirect) connection between a DC voltage source, which functions as an input of the DC/DC converter, and the diode—then the diode's anode is (directly or indirectly) connected to the minus terminal of the DC voltage source and the diode's cathode is (directly or indirectly) connected to the plus terminal of the DC voltage source.

The method starts (and ends) with a state where the sub-circuit is disconnected. The connecting (and disconnecting) may be realized by means of a switch, e.g., by a MOSFET, an IGBT (Insulated-Gate Bipolar Transistor), a thyristor (SCR), a silicon carbide (SiC), and/or a gallium nitride (GaN) based semiconductor. Generally, for this method, when the first switch is connected, it was made sure that the second switch has been disconnected before, and vice versa. Analogously, when the third switch is connected, it was made sure that the fourth switch has been disconnected before, and vice versa.

In a starting step, the capacitance is loaded, by connecting a first end of the sub-circuit to a plus terminal of a DC voltage source, and a second end of the sub-circuit to a minus terminal of the DC voltage source. Then, the first end of the sub-circuit is connected to a plus terminal of an output of the DC/DC converter and the second end of the sub-circuit to the plus terminal of a DC voltage source. (Before this step—as mentioned above —, the first end of the sub-circuit is disconnected from the plus terminal of the DC voltage source, and the second end of the sub-circuit is disconnected from the minus terminal of the DC voltage source). The utilization of the diode of the sub-circuit allows a complete discharge of the sub-circuit's capacitor (and inductor). As a last step, the first end and the second end of the sub-circuit are disconnected.

This method leads to several advantages, compared to other methods, principles and/or implementations for operating a DC/DC converter. One advantage is its simplicity, thus resulting in a quite simple realization of the control module, e.g., there is no need of a powerful control hardware; instead, a simple, robust and less costly microcontroller, FPGA and/or other hardware or firmware may be used. Also, the utilization of a capacitor as storage element has advantages—for at least some embodiments significant advantages—in terms of power density, and/or components may be dimensioned smaller, thus leading to benefits in terms of size and costs of the DC/DC converter. Using the capacitor as storage element eliminates a risk of severe overcurrent, because the current is limited by the capacitor. Furthermore, soft switching can be realized, leading to less stress of at least some of the electronic components, which may contribute to higher reliability and/or availability of the DC/DC converter system. Besides, switching losses may be reduced. A risk of overvoltage is reduced due to Zero Current Switching (i.e., voltage transients in electrical systems, due to optimized utilization of the full potential of the semiconductor switch). The method further has a low risk of oscillations and/or instabilities. For realizing the method, no means or devices for current measurement are needed. As a further benefit, the method provides a base for adjusting the output voltage; this may be controlled by a variation of the operating frequency, i.e., the frequency the switches are controlled. The method may particularly be advantageous for a high-power DC/DC converter and/or for a DC/DC converter with adjustable output voltage.

BRIEF DESCRIPTION OF THE SEVERAL VIEWS OF THE DRAWING(S)

FIGS. 1a, 2a, 3a, 4a, 5a, and 6a schematically represent a circuit of a DC/DC converter according to an embodiment of the disclosure.

FIGS. 1b, 2b, 3b, 4b, 5b, and 6b schematically represent a resulting current curve and a voltage curve of a DC/DC converter according to an embodiment.

FIGS. 7, 8, 9, and 10 are flow diagrams according to some embodiments or aspects.

DETAILED DESCRIPTION OF THE INVENTION

FIG. 1 a schematically shows a circuit of a DC/DC converter 10 operating in a booster mode (Booster I). An input of the DC/DC converter 10 is connected to a DC voltage source "Input", with a plus terminal and a minus terminal of the DC voltage source Input. An output of the DC/DC converter 10 is connected to a DC output "Load." The minus terminal of the DC voltage source Input is connected to the minus terminal of the output Load.

The DC/DC converter 10 comprises a sub-circuit 20. The sub-circuit 20 comprises an inductance L1, in series with and directly connected to an arrangement of a diode D1 in parallel to a capacitance C1. The diode D1 is arranged in a way that it blocks during loading the capacitance C1. "Blocking during loading the capacitance" means that in the loading phase—i.e. when the switches of the DC/DC converter realize a (direct or indirect) connection between a DC voltage source, which functions as an input of the DC/DC converter, and the diode—then the diode's anode is (directly or indirectly) connected to the minus terminal of the DC voltage source and the diode's cathode is (directly or indirectly) connected to the plus terminal of the DC voltage source.

The DC/DC converter 10 further comprises four switches S1-S4. A first switch S1 is arranged between the plus terminal of the output Load of the DC/DC converter 10 and the first end 21 of the sub-circuit 20. A second switch S2 is arranged between the plus terminal of the DC voltage source Input and the first end 21 of the sub-circuit 20. A third switch S3 is arranged between the plus terminal of the DC voltage source Input and the second end 22 of the sub-circuit 20. A fourth switch S4 is arranged between the minus terminal of the DC voltage source Input and/or the minus terminal of an output Load and the second end 22 of the sub-circuit 20.

Parallel to the DC output Load, a first output capacitance $C_{top}$ and a second output capacitance $C_{bottom}$ is arranged. The first output capacitance $C_{top}$ is connected in parallel to the first switch S1 and the second switch S2. The second output capacitance $C_{bottom}$ is connected in parallel to the third switch S3 and the fourth switch S4.

The DC/DC converter 10 of FIG. 1*a* is operated in a booster mode (Booster I), using following operating scheme:

Loading the capacitance C1, by connecting a first end 21 of the sub-circuit 20 to a plus terminal of a DC voltage source Input, by closing switch S2, and connecting a second end 22 of the sub-circuit 20 to a minus terminal of the DC voltage source Input, by closing switch S4.

Opening switches S2 and S4.

Connecting the first end 21 of the sub-circuit 20 to a plus terminal of an output Load of the DC/DC converter 10, by closing switch S1, and the second end 22 of the sub circuit 20 to the plus terminal of a DC voltage source Input, by closing switch S3.

Disconnecting the first end 21 and the second end 22 of the sub-circuit 20, by opening switches S1 and S3.

This operation mode leads to the current curve at L1 and the voltage curve at C1, depicted as "Current at L1" or "Voltage at C1", respectively, in FIG. 1*b*. Before a time $t_0$, all switches S1-S4 are open. At $t_0$, switches S2 and S4 are closed. This leads to a loading of the capacitance C1, i.e., to an increasing of Voltage at C1. This increasing of the voltage leads, in a first sub-phase, to an increasing of Current at L1 and then, in a second sub-phase, to a decreasing of Current at L1, because the energy of L1 is added to the energy from DC voltage source Input. At $t_1$, switches S2 and S4 are opened and switches S1 and S3 are closed, thus discharging C1, and resulting in a higher voltage (voltage of DC voltage source Input plus Voltage at C1) at Load. Hence, Voltage at C1 decreases until $t_2$, leading firstly to an increasing of Current at L1 and then, to an unloading of the energy of L1. Between $t_2$ and $t_3$, the energy of L1 is unloaded via diode D1. At $t_3$, switches S1 and S3 are opened. After a small pause (from $t_3$ to $t_0$), this sequence may be started again.

FIG. 2*a* schematically shows a circuit of a DC/DC converter 10 operating in another booster mode (Booster II). Same reference signs as in FIG. 1*a* refer to same or similar components. The circuit of this "Booster II" may be almost the same as for "Booster I"; however, the operation mode is different. The DC/DC converter 10 of FIG. 2*a* is operated using following scheme:

Loading the capacitance C1, by connecting a first end 21 of the sub-circuit 20 to a plus terminal of a DC voltage source Input, by closing switch S2, and connecting a second end 22 of the sub-circuit 20 to a minus terminal of the DC voltage source Input, by closing switch S4.

Opening switch S2 (and keeping S4 closed).

Connecting the first end 21 of the sub circuit 20 to the plus terminal of the output Load of the DC/DC converter 10, by closing switch S1. The second end 22 of the sub-circuit 20 keeps connected to the minus terminal of the output Load of the DC/DC converter 10.

Disconnecting the first end 21 and the second end 22 of the sub-circuit 20, by opening switches S1 and S4, or in some embodiments only switch S4.

Connecting the first end 21 of the sub-circuit 20 to a plus terminal of an output Load of the DC/DC converter 10, by closing switch S1, and the second end 22 of the sub circuit 20 to the plus terminal of a DC voltage source Input, by closing switch S3.

Disconnecting the first end 21 and the second end 22 of the sub-circuit 20, by opening switches S1 and S3.

This operation mode leads to the current curve at L1 and the voltage curve at C1 are depicted in FIG. 2*b*. Before a time t0, all switches S1-S4 are open. For period t0 to t1 see FIG. 1*b* and the related description. At t1 (voltage peak of Voltage at C1), switch S2 is opened and switch S1 is closed. Thus, the current peak of Current at L1 between t1 and t2 is significantly smaller than the current peak between t1 and t2 of FIG. 1*b*. This significantly reduces the stress on diode D1. At t3, switch S3 is opened and the rest of C1 is discharged until T4. After a small pause (from t4 to t0), this sequence may be started again.

FIG. 3*a* schematically shows a circuit of a DC/DC converter 10 operating in another booster mode (Booster III). Same reference signs as in FIG. 1*a* refer to same or similar components. The circuit of this "Booster III" may be almost the same as for "Booster I", except the additional switch S5, which is arranged in parallel to capacitance C1 (and D1). The DC/DC converter 10 of FIG. 3*a* is operated using following scheme:

Short-circuiting the capacitance C1, by closing the switch S5.

Opening the switch S5.

Loading the capacitance C1, by connecting a first end 21 of the sub-circuit 20 to a plus terminal of a DC voltage source Input, by closing switch S2, and connecting a second end 22 of the sub-circuit 20 to a minus terminal of the DC voltage source Input, by closing switch S4.

Opening switches S2 and S4.

Connecting the first end 21 of the sub-circuit 20 to a plus terminal of an output Load of the DC/DC converter 10, by closing switch S1, and the second end 22 of the sub circuit 20 to the plus terminal of a DC voltage source Input, by closing switch S3.

Short-circuiting the capacitance C1, by closing the switch S5. Alternatively, the current may flow via diode D1.

Opening the switch S5 (in case it has been opened in the step before).

Disconnecting the first end 21 and the second end 22 of the sub-circuit 20, by opening switches S1 and S3.

FIG. 4a schematically shows a circuit of a DC/DC converter 10 operating in a buck mode (Buck I). Same reference signs as in FIGS. 1a and 2a refer to same or similar components. An input of the DC/DC converter 10 is connected to a DC voltage source "Input", with a plus terminal and a minus terminal of the DC voltage source Input. An output of the DC/DC converter 10 is connected to a DC output "Load." The minus terminal of the DC voltage source Input is connected to the minus terminal of the output Load.

The DC/DC converter 10 comprises a sub-circuit 20. The sub-circuit 20 of FIG. 4a is the same as in FIGS. 1a and 2a.

The DC/DC converter 10 further comprises four switches S1-S4. A first switch S1 is arranged between the plus terminal of the DC voltage source Input of the DC/DC converter 10 to a first end 21 of the sub-circuit 20. A second switch S2 is arranged between a plus terminal of an output Load to the first end 21 of the sub-circuit 20. A third switch S3 is arranged between the plus terminal of an output Load to a second end 22 of the sub-circuit 20. A fourth switch S4 is arranged between a minus terminal of the DC voltage source Input and/or a minus terminal of an output Load to the second end 22 of the sub-circuit 20.

Parallel to the DC output Load, an output capacitance $C_{bottom}$ is arranged. An output capacitance $C_{top}$ is connected in parallel to the first switch S1 and the second switch S2. An output capacitance $C_{bottom}$ is connected in parallel to the third switch S3 and the fourth switch S4.

The DC/DC converter 10 of FIG. 4a is operated in a buck mode (Buck I), using following operating scheme:

Loading the capacitance C1, by connecting a first end 21 of the sub-circuit 20 to a plus terminal of a DC voltage source Input, by closing switch S1, and a second end 22 of the sub-circuit 20 to a minus terminal of the DC voltage source Input, by closing switch S4.

Opening switch S1 (and keeping S4 closed).

Connecting the first end 21 of the sub-circuit 20 to a plus terminal of an output Load of the DC/DC converter 10, by closing switch S2.

Disconnecting the first end 21 and the second end 22 of the sub-circuit 20, by opening switches S2 and S4.

In an embodiment, the switch S4 may always be closed (also in the last step) and, thus, be substituted by a wire (i.e. "always connected"), Furthermore, this DC/DC buck converter does not need the switch S3. Hence, the switch S3 may be removed.

Figure 4B:
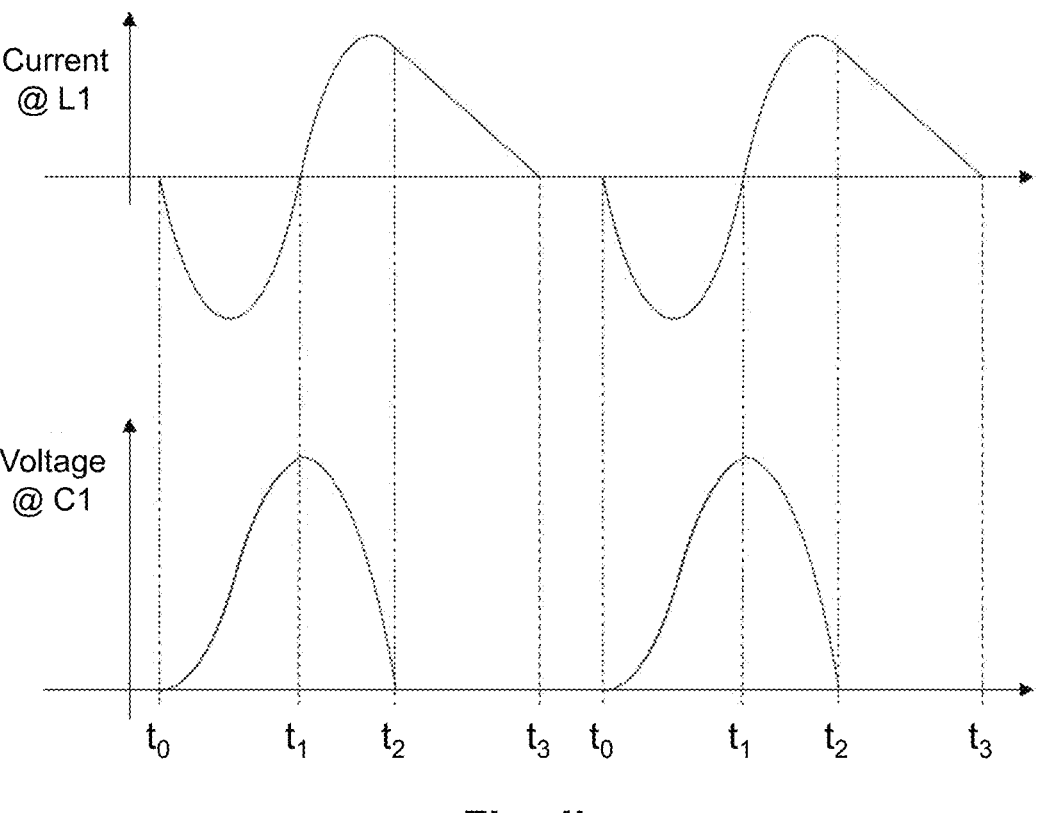

This operation mode leads to the curves depicted as "Current at L1" or "Voltage at C1" in FIG. 4b. Before a time t0, all switches S1-S4 are open. At t0, switches S1 and S4 are closed. This leads to a loading of the capacitance C1, i.e., to an increasing of Voltage at C1. This increasing of the voltage leads, in a first sub-phase, to an increasing of Current at L1 and then, in a second sub-phase, to a decreasing of Current at L1, because the energy of L1 is added to the energy from DC voltage source Input. At t1, switches S1 and S4 are opened, and switch S2 is closed, and S4 is kept closed, thus discharging C1, and resulting in a higher voltage at Load. Hence, Voltage at C1 decreases until t2, leading firstly to an increasing of Current at L1 and then, to an unloading of the energy of L1. Between t2 and t3, the energy of L1 is unloaded via diode D1. At t3, switches S2 and S4 are opened (if S4 is not substituted by a piece of wire). After a small pause (from t3 to t0), this sequence may be started again.

Figure 5A:
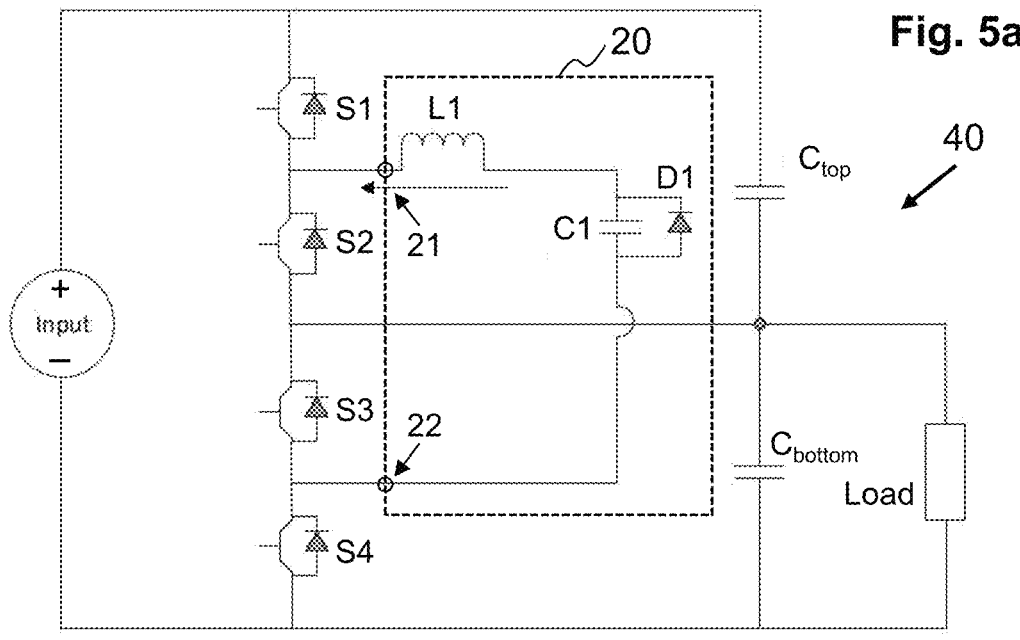

FIG. 5a schematically shows a circuit of a DC/DC converter 10 operating in another buck mode (Buck II). Same reference signs as in FIG. 4a refer to same or similar components. The circuit of this "Buck II" may be almost the same as for "Buck I"; however, the operation mode is different. The DC/DC converter 10 of FIG. 5a is operated using following scheme:

Loading the capacitance C1, by connecting a first end 21 of the sub-circuit 20 to a plus terminal of a DC voltage source Input, by closing switch S1, and a second end 22 of the sub-circuit 20 to a plus terminal of an output Load, by closing switch S3.

Disconnecting the first end 21 and the second end 22 of the sub-circuit 20, by opening switches S1 and S3.

Connecting the first end 21 of the sub-circuit 20 to the plus terminal of the DC voltage source Input, by closing switch S1, and the second end 22 of the sub-circuit 20 to a minus terminal of an output Load, by closing switch S4.

Opening switch S1.

Connecting a first end 21 of the sub-circuit 20 to the plus terminal of an output Load, by closing switch S2.

Disconnecting the first end 21 and the second end 22 of the sub-circuit 20, by opening switches S2 and S4.

Figure 5B:
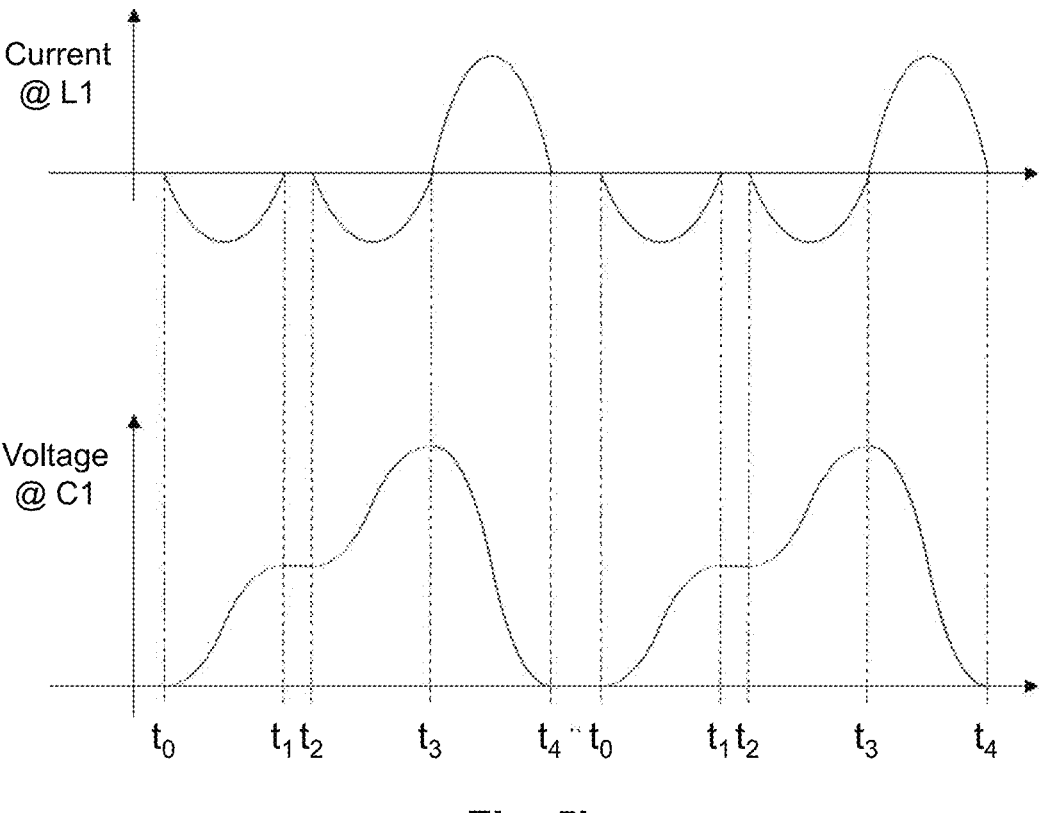

This operation mode leads to the curves depicted as "Current at L1" or "Voltage at C1" in FIG. 5b. Before a time t0, all switches S1-S4 are open. At t0, switches S1 and S3 are closed. This leads to a loading of the capacitance C1, i.e. to an increasing of Voltage at C1, until t1. Opening switches S1 and S3 at t1 leads to increasing Current at L1, until t2, where switches S1 and S4 are closed. At t2, loading capacitance C1 is continued until t3. Also increasing Current at L1. At t3, S1 is closed and S2 is opened, thus discharging C1 until t4. After a small pause (from t4 to t0), this sequence may be started again.

Figure 6A:
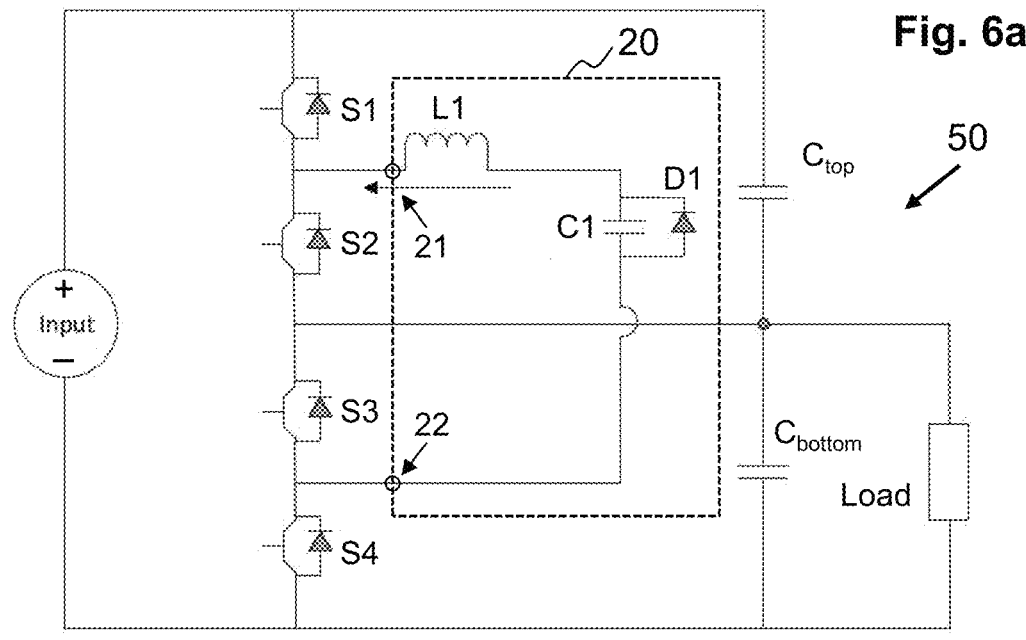

FIG. 6a schematically shows a circuit of a DC/DC converter 10 operating in another buck mode (Buck III). Same reference signs as in FIGS. 4a and 5a refer to same or similar components. The circuit of this "Buck III" may be almost the same as for "Buck I & II"; however, the operation mode is different. The DC/DC converter 10 of FIG. 6a is operated using following scheme:

Loading the capacitance C1, by connecting a first end 21 of the sub-circuit 20 to a plus terminal of a DC voltage source Input, by closing switch S1, and a second end 22 of the sub-circuit 20 to a plus terminal of an output Load, by closing switch S3.

Opening switches S1 and S3.

Connecting the first end 21 of the sub-circuit 20 to the plus terminal of the output Load, by closing switch S2, and the second end 22 of the sub-circuit 20 to a minus terminal of an output Load, by closing switch S4.

Disconnecting the first end 21 and the second end 22 of the sub-circuit 20, by opening switches S2 and S4.

Figure 6B:
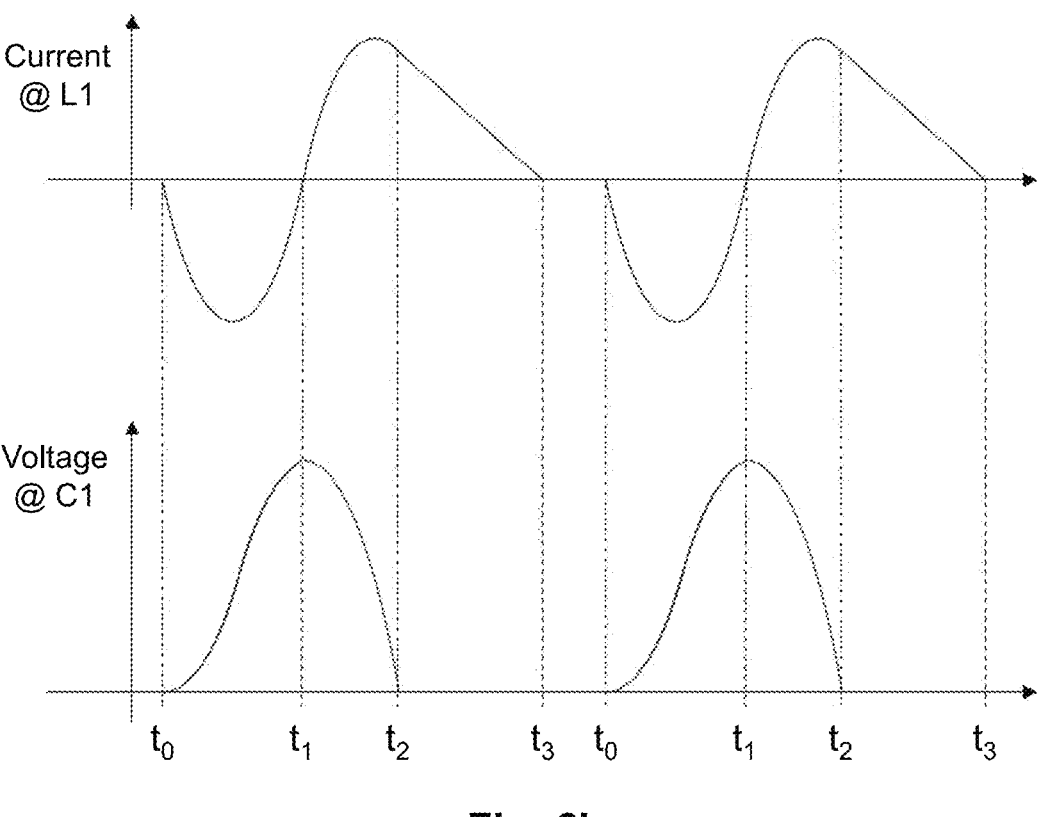

This operation mode leads to the curves depicted as "Current at L1" or "Voltage at C1" in FIG. 6b. Before a time t0, all switches S1-S4 are open. At t0, switches S2 and S4 are closed. This leads to a loading of the capacitance C1, i.e., to an increasing of Voltage at C1. This increasing of the voltage leads, in a first sub-phase, to an increasing of Current at L1 and then, in a second sub-phase, to a decreasing of Current at L1, because the energy of L1 is added to the energy from DC voltage source Input. At t1, switches S1 and S3 are opened and switches S2 and S4 are closed, thus discharging C1, and resulting in a higher voltage (voltage of DC voltage source Input plus Voltage at C1) at Load. Hence, Voltage at C1 decreases until t2, leading firstly to an increasing of Current at L1 and then, to an unloading of the energy of L1. Between t2 and t3, the energy of L1 is unloaded via diode D1. At t3, switches S2 and S4 are opened. After a small pause (from t3 to t0), this sequence may be started again.

Figure 7:
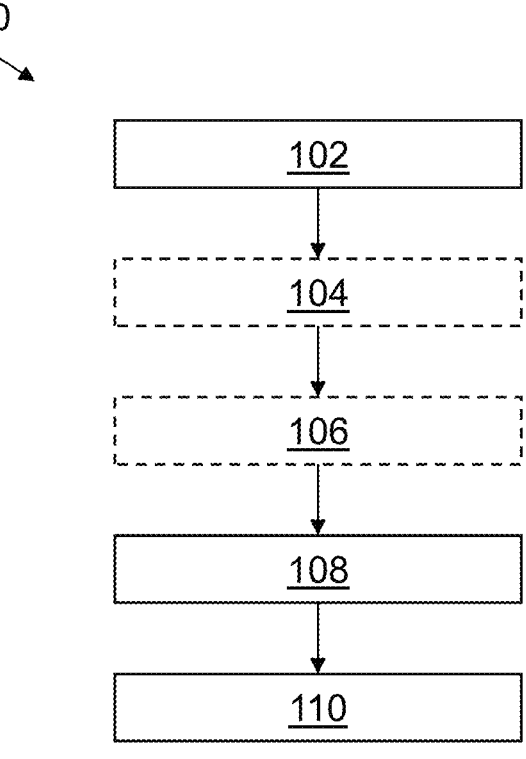

FIG. 7 shows a flow diagram 100 according to some embodiments or aspects. In a step 102, a capacitance C1 (see, e.g., FIG. 1) is loaded, by connecting a first end 21 of the sub-circuit 20 to a plus terminal of a DC voltage source Input and a second end 22 of the sub-circuit 20 to a minus terminal of the DC voltage source Input. In an optional step 104, the first end 21 of the sub circuit 20 is connected to the plus terminal of the output Load of the DC/DC converter 10 and the second end 22 of the sub-circuit 20 to the minus terminal of the output Load of the DC/DC converter 10. In an optional step 106, the first end 21 and the second end 22 of the sub-circuit 20 are disconnected. In a step 108, the first end 21 of the sub-circuit 20 to a plus terminal of an output Load of the DC/DC converter 10 is connected and the second end 22 of the sub circuit 20 to the plus terminal of a DC voltage source Input. In a step 110, the first end 21 and the second end 22 of the sub-circuit 20 are disconnected.

Figure 8:
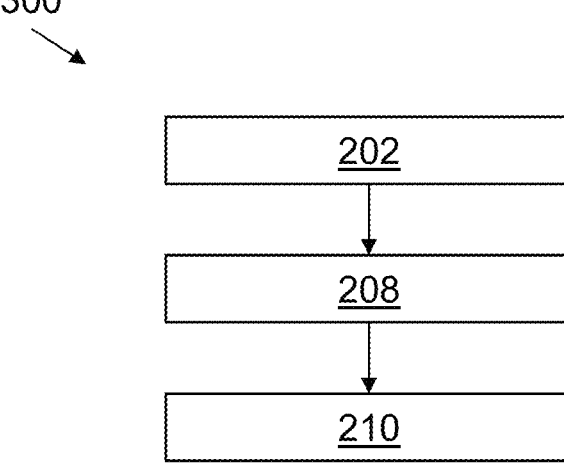

FIG. 8 shows a flow diagram 300 according to some embodiments or aspects. In a step 202, capacitance C1 is loaded, by connecting a first end 21 of the sub-circuit 20 to a plus terminal of a DC voltage source Input and a second end 22 of the sub-circuit 20 to a minus terminal of the DC voltage source Input. In a step 208, the first end 21 of the sub-circuit 20 is connected to a plus terminal of an output Load of the DC/DC converter 10. In a step 210, the first end 21 and the second end 22 of the sub-circuit 20 is disconnected.

Figure 9:
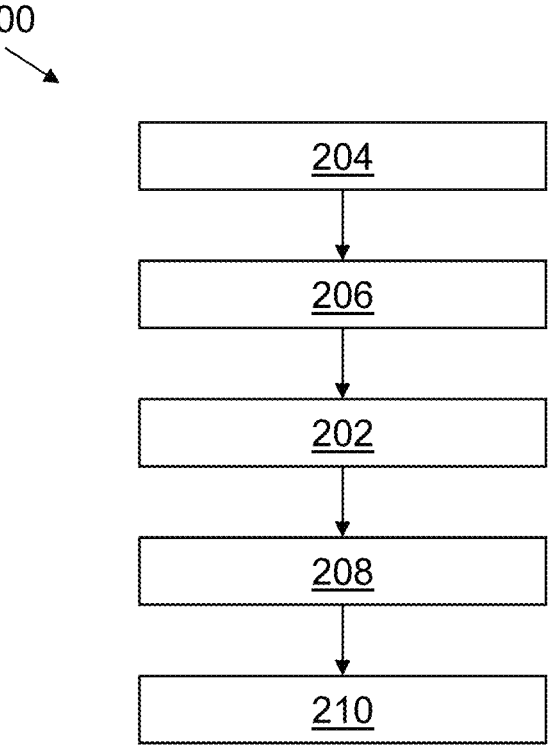

FIG. 9 shows a flow diagram 300 according to some embodiments or aspects. In a step 204, capacitance C1 is loaded, by connecting a first end 21 of the sub-circuit 20 to a plus terminal of a DC voltage source Input and a second end 22 of the sub-circuit 20 to a plus terminal of an output Load. In a step 206, the first end 21 and the second end 22 of the sub-circuit 20 is disconnected. In a step 202, the first end 21 of the sub-circuit 20 is connected to the plus terminal of the DC voltage source Input and the second end 22 of the sub-circuit 20 to a minus terminal of an output Load. In a step 208, a first end 21 of the sub-circuit 20 is connected to the plus terminal of a DC voltage source Input. In a step 210, the first end 21 and the second end 22 of the sub-circuit 20 is disconnected.

Figure 10:
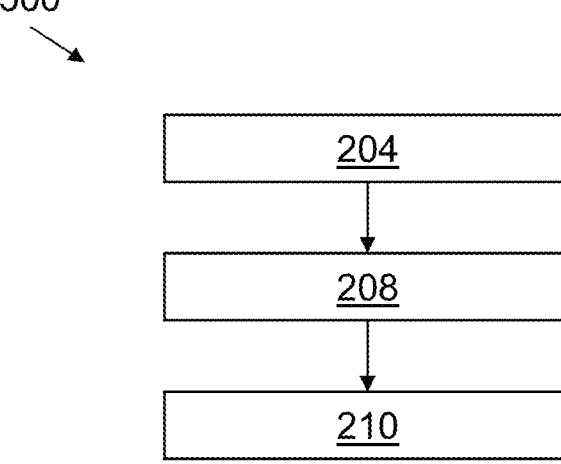

FIG. 10 shows a flow diagram 300 according to some embodiments or aspects. In a step 204, capacitance C1 is loaded, by connecting a first end 21 of the sub-circuit 20 to a plus terminal of a DC voltage source Input and a second end 22 of the sub-circuit 20 to a plus terminal of an output Load. In a step 208, the first end 21 of the sub-circuit 20 is connected to the plus terminal of the DC voltage source Input and the second end 22 of the sub-circuit 20 to a minus terminal of an output Load. In a step 210, the first end 21 and the second end 22 of the sub-circuit 20 is disconnected.

The following table provides a survey of the method steps of realization alternatives of a DC/DC converter as described above and/or below.

| | Sub-circuit's first end (21) connected to | Connecting switch | Sub-circuit's second end (22) connected to | Connecting switch | S5 |
|---|---|---|---|---|---|
| Booster I | | | | | |
| | Input+ | S2 | Input−/Load− | S4 | |
| | Load+ | S1 | Input+ | S3 | |
| | Load+ | S1 | Input+ | S3 | |
| | — | | — | | |
| Booster II | | | | | |
| | Input+ | S2 | Input−/Load− | S4 | |
| | Load+ | S1 | Input−/Load− | S4 | |
| | — | | — | | |
| | Load+ | S1 | Input+ | S3 | |
| | — | | — | | |
| Booster III | | | | | |
| | Input+ | S2 | Input−/Load− | S4 | S5 |
| | Input+ | S2 | Input−/Load− | S4 | |
| | Load+ | S1 | Input+ | S3 | |
| | Load+ | S1 | Input+ | S3 | S5 (D1) |
| | — | | — | | |
| Buck I | | | | | |
| | Input+ | S1 | Input−/Load− | S4 | |
| | Load+ | S2 | Input−/Load− | S4 | |
| | Load+ | S2 | Input−/Load− | S4 | |
| | — | | — | (S4) | |
| Buck II | | | | | |
| | Input+ | S1 | Load+ | S3 | |
| | — | | — | | |
| | Input+ | S1 | Input−/Load− | S4 | |
| | Load+ | S2 | Input−/Load− | S4 | |
| | — | | — | | |
| Buck III | | | | | |
| | Input+ | S1 | Load+ | S3 | |
| | Load+ | S2 | Input−/Load− | S4 | |
| | Load+ | S2 | Input−/Load− | S4 | |
| | — | | — | | |

In this table, the plus terminal of the DC voltage source (Input) is connected to a node between S2 and S3, i.e. between the second and the third switch, and the minus terminal of the DC voltage source (Input) has a "ground" functionality. A person skilled in the art knows that the circuits described in here work in an analogous way, when the plus and minus terminals are permuted, and the switches and diodes are permuted in an analogous way.

In various embodiments, the method further comprising the steps of: after loading the capacitance, connecting the first end of the sub-circuit to the plus terminal of the output of the DC/DC converter and the second end of the sub-circuit to the minus terminal of the output of the DC/DC converter; and disconnecting the first end and the second end of the sub-circuit. This operation strategy advantageously allows to minimize the stress on the diode of the sub-circuit. Furthermore, this guarantees that each transition terminates "by itself".

In various embodiments, the sub-circuit further comprises a switch in parallel to the capacitance, and the method further comprises the steps of: before loading the capacitance, short-circuiting the capacitance by closing the switch; and opening the switch afterwards; and, before disconnecting the first end and the second end of the sub-circuit, closing the switch; and opening the switch afterwards.

One aspect relates to a method for operating a DC/DC converter in a buck mode of a first kind. For this method, the same sub-circuit may be used as for the method that operates a DC/DC converter in a booster mode (see above). The method starts (and ends) with a state where the sub-circuit is disconnected.

In a starting step, the capacitance is loaded, by connecting a first end of the sub-circuit to a plus terminal of a DC voltage source and a second end of the sub-circuit to a minus terminal of the DC voltage source. Then, the first end of the sub-circuit is connected to a plus terminal of an output of the DC/DC converter. As a last step, the first end and, optionally, the second end of the sub-circuit are disconnected. This DC/DC converter may advantageously be used for a conversion ratio from 1 to 0.

This DC/DC buck converter of a first kind does not need the third switch. Hence, the third switch may be removed. Furthermore, the fourth switch is always closed, except in the last step, where the sub-circuit are disconnected. So, in an embodiment, the fourth switch may be substituted by a wire (i.e., "always connected"), wherein in the last step only the first and the second switches are open or disconnected and the (shortened) "fourth switch" keeps "closed" or connected.

One aspect relates to a method for operating a DC/DC converter in a buck mode of a second kind. For this method, the same sub-circuit may be used as for the method that operates a DC/DC converter in a booster mode (see above). The method starts (and ends) with a state where the sub-circuit is disconnected.

In a starting step, the capacitance is loaded, by connecting a first end of the sub-circuit to a plus terminal of a DC voltage source and a second end of the sub-circuit to a plus terminal of an output. Then, the first end and the second end of the sub-circuit are disconnected for a predefined time period. After this, the first end of the sub-circuit is connected to the plus terminal of the DC voltage source and the second end of the sub-circuit to a minus terminal of an output. As a next step, a first end of the sub-circuit is connected to the plus terminal of an output. As a last step, the first end and the second end of the sub-circuit are disconnected. This DC/DC converter may advantageously be used for a conversion ratio from 1 to 0.5.

One aspect relates to a method for operating a DC/DC converter in a buck mode of a third kind. For this method, the same sub-circuit may be used as for the method that operates a DC/DC converter in a booster mode (see above). The method starts (and ends) with a state where the sub-circuit is disconnected.

In a starting step, the capacitance is loaded, by connecting a first end of the sub-circuit to a plus terminal of a DC voltage source and a second end of the sub-circuit to a plus terminal of an output. Then, the first end of the sub-circuit is connected to the plus terminal of an output and the second end of the sub-circuit to a minus terminal of the output. As a last step, the first end and the second end of the sub-circuit are disconnected. This DC/DC converter may advantageously be used for a conversion ratio from 0.5 to 0.

One aspect relates to a booster DC/DC converter. The DC/DC converter comprises a sub-circuit with an inductance in series with and directly connected to an arrangement of a diode in parallel to a capacitance, the diode blocking during loading the capacitance; a first switch, arranged between a plus terminal of an output of the DC/DC converter to a first end of the sub-circuit; a second switch, arranged between a plus terminal of the DC voltage source to the first end of the sub-circuit; a third switch, arranged between the plus terminal of the DC voltage source to a second end of the sub-circuit; and a fourth switch, arranged between a minus terminal of the DC voltage source and/or a minus terminal of an output to the second end of the sub-circuit, wherein the booster DC/DC converter is configured for executing the method as described above and/or below.

One aspect relates to a buck DC/DC converter. The DC/DC converter comprises a sub-circuit with an inductance in series with and directly connected to an arrangement of a diode in parallel to a capacitance, the diode blocking during loading the capacitance; a first switch, arranged between a plus terminal of the DC voltage source of the DC/DC converter to a first end of the sub-circuit; a second switch, arranged between a plus terminal of an output to the first end of the sub-circuit; a third switch, arranged between the plus terminal of an output to a second end of the sub-circuit; and a fourth switch, arranged between a minus terminal of the DC voltage source and/or a minus terminal of an output to the second end of the sub-circuit, wherein the buck DC/DC converter is configured for executing the method as described above and/or below.

In various embodiments, the DC/DC converter is designed for a DC voltage source with a voltage between 100 V and 1500 V, particularly between 200 V and 800 V. The voltage range of the converter may vary from a few Volts (say: 5 V) to more than 3000 V, which corresponds to double the voltage of commercially available IGBTs. Hence, the DC/DC converter can be used for a broad range of DC voltage sources, both for small and middle-range devices, but also for high-power converters, including, e.g., converters for charging electric vehicles, and/or for an uninterruptible power supply (UPS).

In various embodiments, the DC/DC converter is designed for a high frequency operation, particularly the DC/DC converter is operated at a frequency between 10 kHz and 100 kHz, particularly between 50 kHz and 80 kHz. Particularly, the output voltage is a function of the operating frequency. As rule of thumb, the higher the frequency, the higher is the conversion ratio of the DC/DC converter and/or the power transferred by the DC/DC converter. This advantageously makes the DC/DC converter adjustable, contrary to most other DC/DC converters that are based on charge pump principle. For instance, a resonance frequency of the LC sub-circuit may be selected slightly higher than the maximum operational frequency of the control logic in order to guarantee a deadtime. For example, for a 50 kHz switching operation, a resonance frequency of 55 kHz could be a useful choice. The transferred power may be proportional to the operating frequency, so that a highest frequency is used for running the converters at full load. At no load, the operating frequency may be close to zero. An increase of the number of pulses (frequency) involves a larger power flow to the output, which causes an increase of the output voltage.

At full converter power, the deadtime between two pulse sequences (e.g., between $t_3$ and to in FIG. 4b) is very small. In some embodiments, it could even be less than 1 us. At very low load, this deadtime may be higher than 1 ms. For example, a 50 kW 360V to 700V converter may be realized with a 4 μF capacitor and a 1.5 μH inductor operating at a maximum frequency of 50 kHz (which is smaller compared to the resonance of the two passive components). At half load the operating frequency would be 25 kHz.

Furthermore, to reduce the size of the passive components, it may be advantageous to increase the maximum operating frequency. Example values may vary from 10 kHz, using IGBTs, to 500 kHz, if using SiC or GaN MOSFETS as switches.

In various embodiments, the capacitance of the sub-circuit has a value between 1 μF and 10 μF, particularly of 4 μF. This dimensioning may contribute to reduce the manufacturing costs for the DC/DC converter. As a rule of thumb, the capacitance is proportional to the power and inversely proportional to the operating frequency.

In various embodiments, the inductance has a value between 0.1 μH and 2.0 μH, particularly between 0.35 μH and 1.5 μH. This dimensioning may contribute to reduce both the size and the manufacturing costs for the DC/DC converter. Thus, the energy E stored in inductive element of this DC/DC converter is only about $E=P/f \cdot 8$, whereas, e.g., a classical inductance-based booster, the energy E stored in inductive element is about $E=P/f \cdot 2$.

Reducing the capacity of the sub-circuit's capacitance may contribute to optimize an efficiency of the DC/DC converter at low load. This may be realized by arranging two or more sub-circuits (and/or the sub-circuit's capacitances) in parallel, each one of the sub-circuits (and/or the sub-circuit's capacitances) switchable by an additional switch, which is able to connect or remove each one of the sub-circuits (and/or the sub-circuit's capacitances). To maintain the same resonance frequency each additional capacitor may also comprise a dedicated inductor. A smaller capacitor bank may involve smaller currents by means of the switches and, consequently, a conduction loss reduction.

In various embodiments, the DC/DC converter comprises a first output capacitance, connected in parallel to the first switch and the second switch, and a second output capacitance, connected in parallel to the third switch and the fourth switch. These capacitances may contribute to further reducing a ripple voltage of the output.

In various embodiments, the first switch, the second switch, the third switch and/or the fourth switch are implemented as a MOSFET, an IGBT, a thyristor (SCR), a silicon carbide (SiC), and/or a gallium nitride (GaN) based semiconductor. These components may contribute to realize a DC/DC converter that is designed for a high frequency operation, thus reducing, e.g., the dimensions of the capacitance and/or the inductance, which may further lead to reducing the size of the DC/DC converter.

In some embodiments, the DC/DC converter comprises a second sub-circuit, which may have the same structure as the (first) sub-circuit and may be further comprise a switch to activate this second sub-circuit. This may be an optimization for a low load operation of the DC/DC converter. This may create a voltage ratio in the boosting operation that is not limited to a factor of two. The maximum voltage ratio may be about a factor of 2 to 20, particularly of about 2 to 10.

An aspect relates to a use of a DC/DC converter as described above and/or below for providing an adjustable output voltage. The DC/DC converter may be operable for delivering high power; for instance, with currently available standard-switches, the DC/DC converter may be designed for a power conversion up to 100 kW. Of course, several DC/DC converters may be run in parallel and/or be cascaded, depending on requirements of the converter that is to be delivered.

An aspect relates to a use of a DC/DC converter as described above and/or below as a bidirectional battery booster, particularly for charging electric vehicles, and/or for an uninterruptible power supply (UPS).

An aspect relates to a program element for executing the method as described above and/or below, when running the program element on a control device that is configured for controlling a DC/DC converter as described above and/or below, particularly for controlling controllable switches of the DC/DC converter.

An aspect relates to a computer-readable storage medium where a computer program or a computer program product as described above is stored on.

For further clarification, the invention is described by means of embodiments shown in the figures. These embodiments are to be considered as examples only, but not as limiting.

All references, including publications, patent applications, and patents, cited herein are hereby incorporated by reference to the same extent as if each reference were individually and specifically indicated to be incorporated by reference and were set forth in its entirety herein.

The use of the terms "a," "an," "the," "at least one," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for operating a DC/DC converter in a booster mode, the DC/DC converter comprising a sub-circuit with an inductance in series with and directly connected to an arrangement of a diode in parallel to a capacitance, the diode blocking during loading the capacitance, the method comprising:

loading the capacitance, by connecting a first end of the sub-circuit to a plus terminal of a DC voltage source and a second end of the sub-circuit to a minus terminal of the DC voltage source;

connecting the first end of the sub-circuit to a plus terminal of an output of the DC/DC converter and the second end of the sub circuit to the plus terminal of the DC voltage source; and disconnecting the first end and the second end of the sub-circuit.

2. The method of claim 1, further comprising:

after loading the capacitance, connecting the first end of the sub circuit to the plus terminal of the output of the DC/DC converter and the second end of the sub-circuit to the minus terminal of the output of the DC/DC converter; and disconnecting the first end and the second end of the sub-circuit.

3. The method of claim 1, wherein the sub-circuit further comprises a switch in parallel to the capacitance, and wherein the method further comprises:

before loading the capacitance, short-circuiting the capacitance by closing the switch; and opening the switch afterwards; and before disconnecting the first end and the second end of the sub-circuit, closing the switch; and opening the switch afterwards.

4. A method for operating a DC/DC converter in a buck mode, the DC/DC converter comprising a sub-circuit with an inductance in series with and directly connected to an arrangement of a diode in parallel to a capacitance, the diode blocking during loading the capacitance, the method comprising:

loading the capacitance, by connecting a first end of the sub-circuit to a plus terminal of a DC voltage source and a second end of the sub-circuit to a minus terminal of the DC voltage source;

connecting the first end of the sub-circuit to a plus terminal of an output of the DC/DC converter; and disconnecting the first end and the second end of the sub circuit.

5. A method for operating a DC/DC converter in a buck mode, the DC/DC converter comprising a sub-circuit with an inductance in series with and directly connected to an arrangement of a diode in parallel to a capacitance, the diode blocking during loading the capacitance, the method comprising:

loading the capacitance, by connecting a first end of the sub-circuit to a plus terminal of a DC voltage source and a second end of the sub-circuit to a plus terminal of an output;

disconnecting the first end and the second end of the sub-circuit;

connecting the first end of the sub-circuit to the plus terminal of the DC voltage source and the second end of the sub-circuit to a minus terminal of an output;

connecting a first end of the sub-circuit to the plus terminal of an output; and disconnecting the first end and the second end of the sub-circuit.

6. A method for operating a DC/DC converter in a buck mode, the DC/DC converter comprising a sub-circuit with an inductance in series with and directly connected to an arrangement of a diode in parallel to a capacitance, the diode blocking during loading the capacitance, the method comprising:

loading the capacitance, by connecting a first end of the sub-circuit to a plus terminal of a DC voltage source and a second end of the sub-circuit to a plus terminal of an output;

connecting the first end of the sub-circuit to the plus terminal of the output and the second end of the sub-circuit to a minus terminal of an output; and disconnecting the first end and the second end of the sub-circuit.

7. A booster DC/DC converter, comprising:

a sub-circuit with an inductance in series with and directly connected to an arrangement of a diode in parallel to a capacitance, the diode blocking during loading the capacitance;

a first switch, arranged between a plus terminal of an output of the DC/DC converter to a first end of the sub-circuit;

a second switch, arranged between a plus terminal of the DC voltage source to the first end of the sub-circuit;

a third switch, arranged between the plus terminal of the DC voltage source to a second end of the sub-circuit; and a fourth switch, arranged between one or more of a minus terminal of the DC voltage source and a minus terminal of an output to the second end of the sub-circuit.

8. The booster DC/DC converter of claim 7, wherein the sub-circuit further comprises a switch in parallel to the capacitance.

9. A buck DC/DC converter, comprising:

a sub-circuit with an inductance in series with and directly connected to an arrangement of a diode in parallel to a capacitance, the diode blocking during loading the capacitance, a first switch, arranged between a plus terminal of a DC voltage source of the DC/DC converter to a first end of the sub-circuit;

a second switch, arranged between a plus terminal of an output to the first end of the sub-circuit;

a third switch, arranged between the plus terminal of an output to a second end of the sub-circuit; and a fourth switch, arranged between one or more of a minus terminal of the DC voltage source and a minus terminal of an output to the second end of the sub-circuit.

10. A buck DC/DC converter, comprising:

a sub-circuit with an inductance in series with and directly connected to an arrangement of a diode in parallel to a capacitance, the diode blocking during loading the capacitance, a first switch, arranged between a plus terminal of a DC voltage source of the DC/DC converter to a first end of the sub-circuit;

a second switch, arranged between a plus terminal of an output to the first end of the sub-circuit;

a connection, arranged between one or more of a minus terminal of the DC voltage source and a minus terminal of an output to the second end of the sub-circuit.

11. The DC/DC converter of claim 7, wherein the DC/DC converter is designed for a DC voltage source with a voltage between 5 V and 1500 V, particularly between 200 V and 800V, or wherein the DC/DC converter is operated at a frequency between 10 kHz and 100 kHz, particularly between 50 kHz and 80 kHz, and wherein the output voltage is a function of the operating frequency.

12. The DC/DC converter of claim 7, further comprising a first output capacitance, connected in parallel to the first switch and the second switch, and a second output capacitance, connected in parallel to the third switch and the fourth switch.

13. The DC/DC converter of claim 7, wherein one or more of the first switch, the second switch, the third switch, the fourth switch and the fifth switch are implemented as a MOSFET, an IGBT, a thyristor, a silicon carbide, SiC, and/or a gallium nitride, GaN, semiconductor.

\* \* \* \* \*